United States Patent
Inoue et al.

(10) Patent No.: US 12,403,971 B2
(45) Date of Patent: Sep. 2, 2025

(54) HEADLIGHT DEVICE AND LEANING VEHICLE

(71) Applicant: YAMAHA HATSUDOKI KABUSHIKI KAISHA, Iwata (JP)

(72) Inventors: Takehiro Inoue, Shizuoka (JP); Atsushi Kamo, Shizuoka (JP); Takahiro Yamada, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 108 days.

(21) Appl. No.: 18/303,806

(22) Filed: Apr. 20, 2023

(65) Prior Publication Data

US 2023/0249772 A1 Aug. 10, 2023

Related U.S. Application Data

(63) Continuation-in-part of application No. PCT/JP2021/038716, filed on Oct. 20, 2021.

(30) Foreign Application Priority Data

Oct. 21, 2020 (JP) .................................. 2020-176820

(51) Int. Cl.
*B62J 6/023* (2020.01)
*B60Q 1/14* (2006.01)
*H05B 47/115* (2020.01)

(52) U.S. Cl.
CPC .............. *B62J 6/023* (2020.02); *B60Q 1/143* (2013.01); *H05B 47/115* (2020.01); *B60Q 2300/136* (2013.01); *B60Q 2300/42* (2013.01)

(58) Field of Classification Search
CPC .... B62J 6/023; B60Q 1/143; B60Q 2300/136; B60Q 2300/42; B60Q 2300/41;

(Continued)

(56) References Cited

U.S. PATENT DOCUMENTS 7,445,364 B2 * 11/2008 Gropp ..................... B60Q 1/18
362/543
2004/0246732 A1 * 12/2004 Lewis ..................... B62J 6/023
362/523

(Continued)

FOREIGN PATENT DOCUMENTS

EP 2676872 A1 12/2013
EP 3530556 A1 * 8/2019 ............. B60Q 1/115

(Continued)

OTHER PUBLICATIONS

Japanese Patent Office dated Feb. 6, 2024, in the counterpart Japanese application No. 2022-557577.

(Continued)

*Primary Examiner* — Minh Tran
*Assistant Examiner* — Minh D A
(74) *Attorney, Agent, or Firm* — Rabin & Berdo, P.C.

(57) ABSTRACT

A control device of a leaning vehicle for controlling bright lighting and dim lighting for a plurality of oblique areas. When the leaning vehicle is upright, the control device controls the lighting by designating one or more of the plurality of oblique areas as in a brightly lit area to which adaptive lighting control is applied, and by designating the other oblique areas as in a dim area. The dim area includes an uppermost oblique area. When the leaning vehicle turns left or right, as a lean angle in a direction of the turn increases, the control device controls the lighting by designating a second uppermost oblique area that is located immediately below the uppermost oblique area in the up-down direction as in the brightly lit area, and moving the uppermost oblique area from the dim area to the brightly lit area.

13 Claims, 5 Drawing Sheets

(58) Field of Classification Search
CPC ... B60Q 1/08; B60Q 1/10; B60Q 1/14; B60Q 1/16; H05B 47/115; F21W 2102/155; F21W 2107/13; F21S 41/663
See application file for complete search history.

(56) References Cited

U.S. PATENT DOCUMENTS

2013/0241414 A1* 9/2013 Ikeda ................ B62J 6/023
                                                  315/82
2019/0126811 A1   5/2019 Kay et al.

FOREIGN PATENT DOCUMENTS

| EP | 3674601 A1 | 7/2020 |
|----|-----------|--------|
| JP | 2018020683 A | 2/2018 |
| JP | 2018020772 A | 2/2018 |
| WO | 2018168249 A1 | 9/2018 |
| WO | 2019236601 A2 | 12/2019 |

OTHER PUBLICATIONS

Search Report for application FR2111175, mailed on Mar. 14, 2023.

* cited by examiner

HEADLIGHT DEVICE AND LEANING VEHICLE

CROSS REFERENCE TO RELATED APPLICATIONS

This is a continuation-in-part application of International Application PCT/JP2021/038716, filed on Oct. 20, 2021, which claims priority from a Japanese Patent Application No. 2020-176820, filed on Oct. 21, 2020, the contents of which are incorporated herein by reference.

TECHNICAL FIELD

The present teaching relates to a headlight device to be employed in a leaning vehicle and relates to a leaning vehicle.

BACKGROUND ART

In recent years, there exists a leaning vehicle that employs a headlight device that has an adaptive front-lighting function to conduct bright-dark control of the lighting for a plurality of areas in the ahead-driving direction of the vehicle depending on whether or not there is an oncoming vehicle and/or a vehicle ahead. Such a leaning vehicle is disclosed, for example, in International Publication WO 2018/168249.

CITATION LIST

Patent Literature

Patent Literature 1: International Publication WO 2018/168249

SUMMARY OF INVENTION

Technical Problem

An objective of the present teaching is to provide a headlight device with an adaptive front-lighting function to be employed in a leaning vehicle, the headlight device reducing or suppressing energy consumption associated with bright lighting for a plurality of areas in the ahead-driving direction of the leaning vehicle while enabling the rider of the leaning vehicle to see ahead well, especially during a turn.

Solution to the Problem

A headlight device according to an embodiment of the present teaching is configured as follows.
 (1) The headlight device is a headlight device to be employed in a leaning vehicle that, when turning left or right, leans in the direction of the turn.
The headlight device includes a headlight and a control device.
The headlight is configured to perform bright lighting and dim lighting for a plurality of areas in the ahead-driving direction of the leaning vehicle. The plurality of areas includes a pair of a left oblique area set and a right oblique area set that are located in the ahead-driving direction of the leaning vehicle on the left and on the right, respectively. Each of the left and right oblique area sets includes a plurality of oblique areas that are positioned at different heights in an up-down direction when the leaning vehicle is upright.
The control device controls the bright lighting and dim lighting for the pluralities of oblique areas in the respective oblique area sets as follows.
When the leaning vehicle is upright, the control device controls the lighting in each of the oblique area sets by designating one or some of the plurality of oblique areas as a brightly lit area to which adaptive lighting control is applied and by designating the other oblique area(s) as a dim area. The dim area includes an uppermost oblique area. The adaptive lighting control is controlling the bright lighting and dim lighting for the plurality of oblique areas such that when there is an oncoming vehicle and/or a vehicle ahead in the brightly lit area, one or more of the plurality of oblique areas where the oncoming vehicle and/or the vehicle ahead are present is/are changed from a brightly lit area to a dim area. The uppermost oblique area is the oblique area located highest in the oblique area set.
When the leaning vehicle turns left or right, as a lean angle in a direction of the turn increases, the control device controls the lighting in the oblique area set corresponding to the direction of the turn by designating a second uppermost oblique area that is located lower than the uppermost oblique area and adjacent to the uppermost oblique area in the up-down direction as a brightly lit area to which the adaptive lighting control is applied and changing the uppermost oblique area from a dim area to a brightly lit area to which the adaptive lighting control is applied.

With the headlight device of (1), when the leaning vehicle is upright, in each of the oblique area sets, one or some of the plurality of oblique areas is/are designated as a brightly lit area to which the adaptive lighting control is applied, and the other oblique area(s) in the oblique area designated as a dim area. This makes it possible to reduce or suppress energy consumption associated with bright lighting for the plurality of areas in the ahead-driving direction of the vehicle. Specifically, it becomes possible to reduce or suppress the electric power consumption associated with bright lighting for the plurality of areas in the ahead-driving direction of the vehicle and to reduce or suppress the amount of heat generated by the bright lighting. With the headlight device of (1), especially, when the leaning vehicle is upright, the uppermost oblique area located highest in each of the oblique area sets is included in the dim area. When the leaning vehicle is upright, if the plurality of oblique areas in each of the oblique area sets are lit, the light emitted towards the uppermost oblique area illuminates a place farthest from the leaning vehicle. It takes time for the leaning vehicle to arrive at the place illuminated by the light emitted towards the uppermost oblique area. Therefore, when the leaning vehicle is upright, the lighting for the uppermost oblique area is low in priority. With the headlight device of (1), one or some of the plurality of oblique areas in each of the oblique area sets is/are designated as a brightly lit area, which enables the rider of the leaning vehicle to see ahead well, meanwhile the area that is low in priority when the leaning vehicle is upright, namely, the uppermost oblique area is included in the dim area, which enables reduction or suppression of energy consumption associated with bright lighting for the plurality of areas in the ahead-driving direction of the leaning vehicle. When the leaning vehicle turns left or right, as a lean angle in the direction of the turn increases, in the oblique area set corresponding to the direction of the turn, a second uppermost oblique area that is located lower than the uppermost oblique area and adjacent to the uppermost oblique area in the up-down direction is designated as a brightly lit area to which the adaptive lighting control is applied, and the uppermost oblique area is changed from a dim area to a brightly lit area to which the adaptive lighting control is applied. This allows a place that the rider sees during the turn of the leaning vehicle to be lit brightly. Thus, the rider of the leaning vehicle can see ahead well, especially during a turn of the leaning vehicle. With the headlight device of (1), especially, when the leaning vehicle turns, the uppermost oblique area that is located highest in the oblique area set corresponding to the direction of the turn is changed from a dim area to a brightly lit area. When the leaning vehicle turns, the place illuminated by the light emitted towards the uppermost oblique area in the oblique area set corresponding to the direction of the turn is ahead in the direction of movement of the leaning vehicle but comes closer to the leaning vehicle than the place illuminated by the light when the leaning vehicle is upright. Therefore, when the leaning vehicle turns, the lighting for the uppermost oblique area is high in priority. With the headlight device of (1), when the leaning vehicle turns, the area that is high in priority, namely the uppermost oblique area is changed from a dim area to a brightly lit area, which allows the rider of the leaning vehicle to see ahead well, especially during a turn of the leaning vehicle. Thus, the headlight device of (1) can enable reduction or suppression of energy consumption associated with bright lighting for the plurality of areas in the ahead-driving direction of the vehicle while enabling the rider of the leaning vehicle to see ahead well, especially during a turn.

(2) The headlight device of (1) is, for example, configured as follows.

In each of the oblique area sets, the plurality of oblique areas includes a single immediately-higher-than-horizontal oblique area.

The single immediately-higher-than-horizontal oblique area is an oblique area that is located lower than the uppermost oblique area and has a lower edge located nearest to a horizontal reference line among the lower edges of the plurality of oblique areas when the leaning vehicle is upright.

When the leaning vehicle is upright, the single immediately-higher-than-horizontal oblique area is designated as a brightly lit area to which the adaptive lighting control is applied.

With the headlight device of (2), when the leaning vehicle is upright, the immediately-higher-than-horizontal oblique area, of which the lower edge is nearest to the horizontal reference line, is designated as a brightly lit area to which the adaptive lighting control is applied. Therefore, it is possible to reduce or suppress energy consumption while lighting the place around the horizontal reference line, thereby enabling the rider to see ahead well.

(3) The headlight device of (2) is, for example, configured as follows.

In each of the oblique area sets, the plurality of oblique areas that includes the uppermost oblique area and the single immediately-higher-than-horizontal oblique area, also includes an intermediate oblique area. The intermediate oblique area is located between the uppermost oblique area and the single immediately-higher-than-horizontal oblique area in the up-down direction. The intermediate oblique area is composed of one or more oblique areas. When the leaning vehicle is upright, the single immediately-higher-than-horizontal oblique area is designated as a brightly lit area to which the adaptive lighting control is applied. The uppermost oblique area is designated a dim area. In the intermediate oblique area, one or more of the oblique areas that is/are continued from the uppermost oblique area is/are designated as a dim area. If there are any other oblique areas in the intermediate oblique area, the other oblique areas are designated as a brightly lit area to which the adaptive lighting control is applied.

With the headlight device of (3), it is possible to reduce or suppress energy consumption while lighting the place around the horizontal reference line, thereby enabling the rider to see ahead well.

(4) The headlight device of (3) is, for example, configured as follows.

When one or more of the oblique areas in the intermediate oblique area is/are designated as a dim area, the control device controls a light source for the one or more of the oblique areas such that the one or more of the oblique areas is/are lit by a reduced amount of light so as to be lit less brightly than the single immediately-higher-than-horizontal oblique area but more brightly than the uppermost oblique area.

With the headlight device of (4), it is possible to reduce or suppress energy consumption while lighting the place around the horizontal reference line, thereby enabling the rider to see ahead well.

(5) The headlight device of any one of (1) to (4) is, for example, configured as follows.

In each of the oblique area sets, the plurality of oblique areas includes a single immediately-lower-than-horizontal oblique area.

The single immediately-lower-than-horizontal oblique area is an oblique area that has an upper edge located nearest to a horizontal reference line among the upper edges of the plurality of oblique areas when the leaning vehicle is upright.

When the leaning vehicle is upright, the immediately-lower-than-horizontal oblique area is designated as a brightly lit area to which the adaptive lighting control is applied.

With the headlight device of (5), when the leaning vehicle is upright, the immediately-lower-than-horizontal oblique area, of which the upper edge is nearest to the horizontal reference line, is designated as a brightly lit area to which the adaptive lighting control is applied. Therefore, it is possible to reduce or suppress energy consumption while lighting the place around the horizontal reference line, thereby enabling the rider to see ahead well.

(6) The headlight device of (5) is, for example, configured as follows.

In each of the oblique area sets, the plurality of oblique areas includes a lower oblique area in addition to the single immediately-lower-than-horizontal oblique area. The lower oblique area is located lower than the single immediately-lower-than-horizontal oblique area in the up-down direction. The lower oblique area is composed of one or more oblique areas.

When the leaning vehicle is upright, the single immediately-lower-than-horizontal oblique area is designated as a brightly lit area to which the adaptive lighting control is applied. In the lower oblique area, only a single lowermost oblique area, or the single lowermost oblique area and one or more of the oblique areas that is/are continued from the lowermost oblique area is/are designated as a dim area. If there are any other oblique areas in the lower oblique area, the other oblique areas are designated as a brightly lit area to which the adaptive lighting control is applied.

With the headlight device of (6), it is possible to reduce or suppress energy consumption while lighting the place around the horizontal reference line, thereby enabling the rider to see ahead well.

(7) The headlight device of (5) or (6) is, for example, configured as follows.

When either only the single lowermost oblique area in the lower oblique area, or both of the single lowermost oblique area and one or more of the oblique areas that is/are continued from the lowermost oblique area is/are designated as a dim area, the control device controls light sources for the single lowermost oblique area and the one or more of the oblique areas continued from the lowermost oblique area such that either only the single lowermost oblique area, or both of the single lowermost oblique area and the one or more of the oblique areas is/are lit by a reduced amount of light so as to be lit less brightly than the single immediately-lower-than-horizontal oblique area.

With the headlight device of (7), it is possible to reduce or suppress energy consumption while lighting the place around the horizontal reference line, thereby enabling the rider to see ahead well.

(8) The headlight device of any one of (1) to (7) is, for example, configured as follows.

When the leaning vehicle turns left or right, as a lean angle in a direction of the turn increases, the control device controls the bright lighting and dim lighting for the plurality of oblique areas in the oblique area set corresponding to the direction of the turn such that the brightly lit area shifts upward direction of the vehicle and that during the process of the shift, the brightly lit area shifts from the second uppermost oblique area to the uppermost oblique area.

With the headlight device (8), when the leaning vehicle turns, the brightly lit area in the oblique area set corresponding to the direction of the turn is shifted, and thereby, the energy consumption associated with bright lighting in the oblique area set can be kept constant.

(9) The headlight device of any one of (1) to (8) is, for example, configured as follows.

When the leaning vehicle turns left or right, as a lean angle in a direction of the turn increases, the control device controls the bright lighting and dim lighting for the pluralities of oblique areas in the respective oblique area sets such that in the oblique area set corresponding to the direction of the turn, the number of oblique areas constituting a brightly lit area increases, whereby the brightly lit area as a whole enlarges in the up-down direction, meanwhile in the other oblique area set, the number of oblique areas constituting a brightly lit area decreases, whereby the brightly lit area as a whole shrinks in the up-down direction, and that during the process of increasing the number of oblique areas constituting the brightly lit area from the set corresponding to the turn, after the second uppermost oblique area becomes a component of the brightly lit area, the uppermost oblique area becomes a component of the brightly lit area.

With the headlight device of (9), when the leaning vehicle turns, in both the oblique area set corresponding to the direction of the turn and the other oblique area set, the brightly lit area changes, and thereby keeping the energy consumption associated with bright lighting as a whole constant. By achieving a left-right balance, the energy consumption can be kept constant.

(10) The headlight device of any one of (1) to (9) is, for example, configured as follows.

The bright lighting is to light one or some of the plurality of areas in the ahead-driving direction of the leaning vehicle more brightly than the dim lighting.

The dim lighting is either to light one or some of the plurality of areas in the ahead-driving direction of the leaning vehicle less brightly or to not light one or some of the plurality of areas in the ahead-driving direction of the leaning vehicle.

The brightly lit area is an area set to be lit more brightly by the headlight device than the dim area.

The dim area is an area set either to be lit less brightly by the headlight device than the brightly lit area or set to be unlit by the headlight device.

With the headlight device of (10), for the rider of the leaning vehicle, the brightly lit area and the dim area are more distinguishable from each other. It is possible to reduce or suppress energy consumption while enabling the rider to see ahead well, especially during a turn.

(11) The headlight device of any one of (1) to (10) is, for example, configured as follows.

When a light source for one of the oblique areas is turned on to emit light with a particular brightness that is more than half of a maximum brightness of the light source, the oblique area lit by the light is a brightly lit area, and the brightness of the brightly lit area at the time is defined as a maximum brightness of the brightly lit area.

The bright lighting is defined such that the light source lights the oblique area in such a manner as to cause the oblique area to have a brightness that is more than half of the maximum brightness of the brightly lit area.

The dim lighting is that the light source lights the oblique area less brightly than the bright lighting or does not light the oblique area.

The brightly lit area is set to be lit by the headlight device in such a manner as to have a higher brightness than a dim area.

The dim area is set to be lit by the headlight device in such a manner as to have a lower brightness than the brightly lit area or is set to be unlit by the headlight device.

With the headlight device of (11), when a light source for one of the oblique areas is turned on to emit light with a particular brightness that is more than half of a maximum brightness of the light source, the oblique area lit by the light is a brightly lit area, and the brightness of the brightly lit area at the time is a maximum brightness of the brightly lit area. The bright lighting is performed by the light source lighting the oblique area in such a manner so as to cause the oblique area to have a brightness that is more than half of the maximum brightness of the brightly lit area. In this way, the brightness of the brightly lit area can be obtained. Also, the dim lighting is performed by the light source lighting the oblique area less brightly than the bright lighting or by not lighting the oblique area. Then, for the rider of the leaning vehicle, the brightly lit area and the dim area are more distinguishable from each other. Therefore, it is possible to reduce or suppress energy consumption while enabling that the rider of the leaning vehicle to see ahead well, especially during a turn.

(12) The headlight device of any one of (1) to (11) is, for example, configured as follows.

When a light source for one of the oblique areas is turned on to emit light with a particular brightness that is more than 60% of a maximum brightness of the light source, the oblique area lit by the light is a brightly lit area, and the brightness of the brightly lit area at the time is defined as a maximum brightness of the brightly lit area.

The bright lighting is defined such that the light source lights the oblique area in such a manner as to cause the oblique area to have a brightness that is more than 60% of the maximum brightness of the brightly lit area.

The dim lighting is that the light source lights the oblique area less brightly than the bright lighting or does not light the oblique area.

The brightly lit area is set to be lit by the headlight device in such a manner as to have a higher brightness than a dim area.

The dim area is set to be lit by the headlight device in such a manner as to have a lower brightness than the brightly lit area or is set to be unlit by the headlight device.

With the headlight device of (12), when a light source for one of the oblique areas is turned on to emit light with a particular brightness that is more than 60% of a maximum brightness of the light source, the oblique area lit by the light source is a brightly lit area, and the brightness of the brightly lit area at the time is a maximum brightness of the brightly lit area. The bright lighting is performed by the light source lighting the oblique area in such a manner so as to cause the oblique area to have a brightness that is more than 60% of the maximum brightness of the brightly lit area. In this way, the brightness of the brightly lit area can be obtained. Also, the dim lighting is performed by the light source lighting the oblique area less brightly than the bright lighting or by not lighting the oblique area. Then, for the rider of the leaning vehicle, the brightly lit area and the dim area are more distinguishable from each other. Therefore, it is possible to reduce or suppress energy consumption while enabling the rider of the leaning vehicle to see ahead well, especially during a turn.

A leaning vehicle according to an embodiment of the present teaching includes a leaning vehicle body that, when the leaning vehicle turns left or right, leans in a direction of the turn, and the headlight device of any one of (1) to (12).

This leaning vehicle allows the rider to see ahead well, especially during a turn of the leaning vehicle, and the energy consumption associated with bright lighting for a plurality of areas in the ahead-driving direction of the vehicle can be reduced or suppressed.

In the headlight device according to one embodiment of the present teaching, an area is, for example, an area to be lit by a light source contained in the headlight. The headlight device according to one embodiment of the present teaching is a fixed light distribution type, and the headlight is configured to maintain its physical settings for light distribution. The plurality of areas is settled in such a manner so as to have a fixed relative positional relationship with one another. The light source, for example, is a light emitting diode, a semiconductor laser, an HID (high-intensity discharge) bulb, a halogen lamp, an incandescent bulb, or the like. The light source may direct light towards the place in the ahead-driving direction of the leaning vehicle or may illuminate the place in the ahead-driving direction of the leaning vehicle via a light-reflective member. The light sources are provided individually for the plurality of oblique areas. When electric power is supplied to the light source, the light source emits light. The way to supply electric power to the light source is not particularly limited.

In the headlight device according to one embodiment of the present teaching, the control device is, for example, an ECU (electric control unit). The ECU is realized, for example, by a combination of an IC (integrated circuit), an electronic component, a circuit board, etc. The control device performs the control, for example, when a CPU (central processing unit) reads a program stored in a non-volatile memory, performs predetermined processing following the program, and the like.

When the leaning vehicle is upright, the plurality of oblique areas is positioned at different heights in the up-down direction. The plurality of oblique areas may overlap one another or may not overlap one another at all. Among the plurality of oblique areas, two adjacent oblique areas in the up-down direction may overlap each other or may not overlap each other at all. An oblique area located on the left or right may be entirely included in the space on the left or right, or more than half of an oblique area located on the left or right may be included in the space on the left or right.

The second uppermost oblique area may be a brightly lit area or may be a dim area when the leaning vehicle is upright. All that is required is that the second uppermost oblique area is a brightly lit area at the time when the uppermost oblique area is changed from a dim area to a brightly lit area. After the uppermost oblique area is changed from a dim area to a brightly lit area, the second uppermost oblique area may be a brightly lit area or may be a dim area. For example, at the same time as the uppermost oblique area is changed from a dim area to a brightly lit area, the second uppermost oblique area may be changed from a brightly lit area to a dim area. For example, when the lean angle is at its maximum, the uppermost oblique area may be a brightly lit area, and the second uppermost oblique area may be a dim area.

The horizontal reference line is, for example, a leftward and rightward extended line of the boundary line extending in the left-right direction of the leaning vehicle at the upper edge of a specified area when the leaning vehicle is upright. The specified area may be an area lit by a low beam of the leaning vehicle or may be the immediately-lower-than-horizontal oblique area. The horizontal reference line, for example, may overlap the upper edge of the immediately-lower-than-horizontal oblique area or may overlap the lower edge of the immediately-upper-than-horizontal oblique area.

The immediately-upper-than-horizontal oblique area may be or may not be the second uppermost oblique area itself. When the immediately-upper-than-horizontal oblique area is not the second uppermost oblique area, the immediately-upper-than-horizontal oblique area and the second uppermost oblique area may be adjacent to each other in the up-down direction, or one or more oblique areas may intervene between the immediately-upper-than-horizontal oblique area and the second uppermost oblique area.

The immediately-lower-than-horizontal oblique area may be or may not be the second uppermost oblique area itself. When the immediately-lower-than-horizontal oblique area is not the second uppermost oblique area, the immediately-lower-than-horizontal oblique area and the second uppermost oblique area may be adjacent to each other in the up-down direction, or one or more oblique areas may intervene between the immediately-lower-than-horizontal oblique area and the second uppermost oblique area.

The upward shift of the brightly lit area is a shift within the oblique area set. When the vertical direction of the leaning vehicle is used as a reference, the shift of the brightly lit area with the increase of the lean angle in the direction of the turn of the leaning vehicle may look like an upward shift but does not necessarily look like an upward shift. When two or more oblique areas that are continuous in the up-down direction are lit brightly and constitute a brightly lit area, the upward shift of the brightly lit area is realized, for example, by both an upward shift of the highest oblique area in the brightly lit area and also an upward shift of the oblique area located lowest in the brightly lit area. The upward shift of the highest oblique area in the brightly lit area is realized by changing the dim oblique area adjacent to the oblique area located highest in the brightly lit area from a dim area to a brightly lit area. The upward shift of the oblique area located lowest in the brightly lit area is realized by changing the oblique area located lowest in the brightly lit area from a brightly lit area to a dim area. The upward shift of the oblique area located highest in the brightly lit area is not necessarily required to be carried out at the same time as the upward shift of the oblique area located lowest in the brightly lit area.

The shift of a brightly lit area from the second uppermost oblique area to the uppermost oblique area may be realized by both changing the second uppermost oblique area from a brightly lit area to a dim area and also changing the uppermost oblique area from a dim area to a brightly lit area. In this case, one brightly lit oblique area shifts in the up-down direction. The shift of a brightly lit area from the second uppermost oblique area to the uppermost oblique area may be realized by changing the uppermost oblique area from a dim area to a brightly lit area with the second uppermost oblique area kept brightly lit. Two or more brightly lit areas that are continuous in the up-down direction may shift in the up-down direction.

Increasing the number of oblique areas constituting the brightly lit area in one of the oblique area sets to enlarge the brightly lit area as a whole in the up-down direction is not necessarily required to be carried out at the same time as decreasing the number of oblique areas constituting the brightly lit area in the other oblique area set to shrink the brightly lit area as a whole in the up-down direction.

A change between dim lighting and bright lighting may be a change between lighting and non-lighting or may be a change in brightness. A change in the brightness of one area is carried out entirely or partly.

The adaptive lighting control may be, but need not be, applied to the dim area.

The oncoming vehicle is a vehicle moving in a direction opposite to the direction of movement of the leaning vehicle employing the headlight device according to one embodiment of the present teaching, and the oncoming vehicle is not particularly limited.

The vehicle ahead is a vehicle moving in a direction same as the direction of movement of the leaning vehicle employing the headlight device according to one embodiment of the present teaching, and the vehicle ahead is not particularly limited. The vehicle ahead is not necessarily running in the same traffic lane as the leaning vehicle employing the headlight device according to one embodiment of the present teaching.

The presence or non-presence of an oncoming vehicle and/or a vehicle ahead is determined, for example, based on a signal sent from a detection device that detects an oncoming vehicle and/or a vehicle ahead. The detection device may be attached to the headlight device. The detection device may be attached to the leaning vehicle in such a manner so as to be able to communicate with the headlight device by wire or wirelessly. Such a detection device is, for example, a photosensor that can detect light emitted from an oncoming vehicle and/or a vehicle ahead.

The change of the area where there is an oncoming vehicle or a vehicle ahead from a brightly lit area to a dim area may be targeted only at the area where the oncoming vehicle or the vehicle ahead is present or may be targeted at other area in addition to the area where the oncoming vehicle or the vehicle ahead is present. The other area includes, for example, an area adjacent to the area where the oncoming vehicle or the vehicle ahead is present.

In the headlight device according to one embodiment of the present teaching, the headlight may include at least one light source that emits light in the ahead-driving direction of the leaning vehicle, and a case that encases the at least one light source. The case may contain the detection device. The case may include a case body and an outer lens. The outer lens may be attached to the case body at a position in front of the at least one light source. The case may contain the control device.

According to an embodiment of the present teaching, the leaning vehicle employing the headlight device, for example, includes at least one front wheel and at least one rear wheel. The leaning vehicle may be a straddled vehicle. The straddled vehicle is a vehicle that a rider sits on like straddling a saddle. The leaning vehicle may include a sit-in type seat. The leaning vehicle, for example, includes a drive source that supplies impelling force to the leaning vehicle. The drive source may be an engine, an electric motor, or a combination of an engine and an electric motor. The leaning vehicle, for example, includes a vehicle body that, when the leaning vehicle turns left or right, leans in the direction of the turn. Specifically, when the leaning vehicle turns left, the vehicle body leans leftward, and when the leaning vehicle turns right, the vehicle body leans rightward. The vehicle body includes a vehicle body frame. The vehicle body frame may be a frame constructed by assembling a plurality of parts or a frame formed by integrally molding a plurality of parts. The material of the vehicle body frame may be metal, such as aluminum, iron or the like, synthetic resin, such as CFRP or the like, or a combination of such metal and synthetic resin. The vehicle body frame may be a monocoque structure that is structured by exterior parts of the leaning vehicle or a semi-monocoque structure of which some part serves also as exterior parts of the leaning vehicle.

Some embodiments of the present teaching will hereinafter be described in detail with reference to the drawings, and the detailed description of the embodiments will provide a clearer picture of the above-mentioned object and other objects, the features, the aspects and the advantages of the present teaching. The term "and/or" used herein includes one of the associated items in a list and all possible combinations of the associated items. The terms "including", "comprising", or "having", and variations thereof used herein specify the presence of stated features, steps, operations, elements, components, and/or equivalents thereof, and can include one or more of the steps, operations, elements, components, and/or their groups. Unless otherwise defined, all terms (including technical and scientific terms) used herein have the same meanings as commonly understood by one of ordinary skill in the art to which the present teaching pertains. It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein. It should be understood that the description of the present teaching discloses a number of techniques and steps. Each of these has an individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Effect of Invention

The present teaching provides a headlight device with an adaptive front-lighting function to be employed in a leaning vehicle, the headlight device enabling reduction or suppression of energy consumption associated with bright lighting for a plurality of areas in the ahead-driving direction of the leaning vehicle while enabling the rider of the leaning vehicle to see ahead well, especially during a turn.

DESCRIPTION OF EMBODIMENTS

A leaning vehicle according to an embodiment of the present teaching will hereinafter be described in detail with reference to the drawings. The embodiment described below is merely an example. The present teaching shall not be considered limited to the embodiment below.

Figure 1:
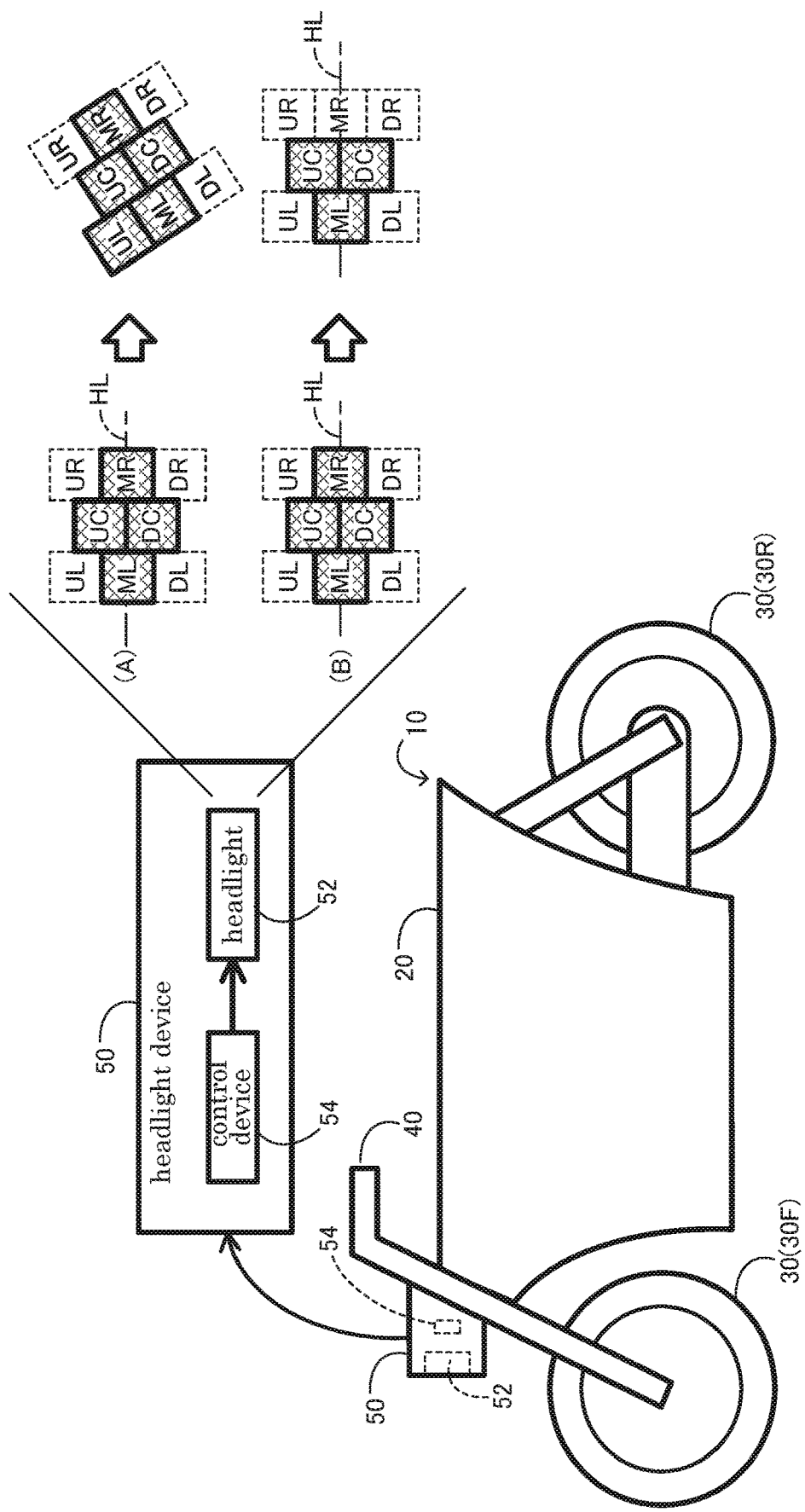
FIG. 1 shows a left side view of a leaning vehicle according to an embodiment of the present teaching, a block diagram showing the framework of a headlight device contained in the leaning vehicle, an illustration showing an example of a change of brightly lit areas while the leaning vehicle is turning left from an upright state, and an illustration showing an example of a change of an oblique area where there is an oncoming vehicle and/or a vehicle ahead from a brightly lit area to a dim area.

With reference to FIG. 1, a leaning vehicle 10 according to an embodiment of the present teaching will be described. FIG. 1 shows a left side view of the leaning vehicle 10, a block diagram of a headlight device 50 contained in the leaning vehicle 10, an illustration showing a change of brightly lit areas while the leaning vehicle 10 is turning left from an upright state, and an illustration showing an example of a change of an oblique area where there is an oncoming vehicle and/or a vehicle ahead from a brightly lit area to a dim area.

As shown in FIG. 1, the leaning vehicle 10 includes a vehicle body 20 as a leaning vehicle body, a plurality of wheels 30, and a handle 40. These will be described below.

When the leaning vehicle turns left or right, the vehicle body 20 leans in the direction of the turn. Specifically, when the leaning vehicle 10 turns left, the vehicle body 20 leans leftward, and when the leaning vehicle 10 turns right, the vehicle body 20 leans rightward. The vehicle body 20 includes a vehicle body frame. A power unit is supported by the vehicle body frame. The power unit includes, for example, an engine serving as a drive source, a transmission, etc.

The vehicle body 20 supports the plurality of wheels 30. When the leaning vehicle turns left, the plurality of wheels 30 leans leftward along with the vehicle body 20, and when the leaning vehicle 10 turns right, the plurality of wheels 30 leans rightward along with the vehicle body 20. The plurality of wheels 30 includes a front wheel 30F that is steered in accordance with operation of the handle 40 conducted by the rider, and a rear wheel 30R that is rotated by power transmitted from the power unit.

The leaning vehicle 10 further includes a headlight device 50. The headlight device 50 is configured to be employed in the leaning vehicle 10, which, when turning left or right, leans in the direction of the turn. The headlight device 50 includes a headlight 52 and a control device 54.

The headlight 52 lights a place in the ahead-driving direction of the leaning vehicle 10. The headlight 52 includes a plurality of light sources. Each of the plurality of light sources emits light in the ahead-driving direction of the leaning vehicle 10. The headlight 52 is supported by the vehicle body 20.

The headlight 52 is configured to perform bright lighting and dim lighting for a plurality of areas UL, ML, DL, UC, DC, UR, MR and DR in the ahead-driving direction of the leaning vehicle 10. The bright lighting means lighting these areas more brightly than the dim lighting. The dim lighting means lighting these areas less brightly than the bright lighting or not lighting these areas. The plurality of areas UL, ML, DL, UC, DC, UR, MR and DR includes a left oblique area set located in the ahead-driving direction of the leaning vehicle on the left and a right oblique area set located in the ahead-driving direction of the leaning vehicle 10 on the right. The oblique area set located in the ahead-driving direction of the leaning vehicle 10 on the left includes a plurality of oblique areas UL, ML and DL. The oblique area set located in the ahead-driving direction of the leaning vehicle 10 on the right includes a plurality of oblique areas UR, MR and DR.

In the example shown by FIG. 1, there are three oblique areas UL, ML and DL as the plurality of oblique areas located in the ahead-driving direction of the leaning vehicle 10 on the left. When the leaning vehicle 10 is upright, the plurality of oblique areas UL, ML and DL located in the ahead-driving direction of the leaning vehicle 10 on the left are at different heights in the up-down direction.

In the example shown by FIG. 1, there are three areas UR, MR and DR as the plurality of oblique areas located in the ahead-driving direction of the leaning vehicle 10 on the right. When the leaning vehicle 10 is upright, the plurality of oblique areas UR, MR and DR located in the ahead-driving direction of the leaning vehicle 10 on the right are at different heights in the up-down direction.

In the example shown by FIG. 1, the plurality of areas UL, ML, DL, UC, DC, UR, MR and DR includes two center areas UC and DC. The center areas UC and DC are located between the plurality of oblique areas UL, ML and DL located in the ahead-driving direction of the leaning vehicle 10 on the left and the plurality of oblique areas UR, MR and DR located in the ahead-driving direction of the leaning vehicle 10 on the right with respect to the left-right direction of the leaning vehicle 10.

When the leaning vehicle 10 is upright, on the left of the leaning vehicle 10, the control device 54 designates one or some of the plurality of oblique areas UL, ML and DL as (a) brightly lit area(s) and designates the other oblique area(s) as (a) dim area(s). Here, the brightly lit area is set to be lit more brightly by the headlight device 50 than the dim area. The dim area is set to be lit less brightly by the headlight device 50 than the brightly lit area or is to be unlit by the headlight device 50. The brightly lit area is identified by applying the light of the headlight 52 to a screen placed in the ahead-driving direction of the leaning vehicle 10. In FIG. 1, the brightly lit area is hatched with its outline shown by solid line. The dim area is not hatched with its outline shown by dashed line.

In the example of FIG. 1, when the leaning vehicle 10 is upright, the brightly lit area on the left of the leaning vehicle 10 is the horizontal oblique area ML. In other words, when the leaning vehicle 10 is upright, the brightly lit area on the left of the leaning vehicle 10 is set such that the upper oblique area UL and the lower oblique area DL remain as dim areas. In the example shown by FIG. 1, among the plurality of oblique areas UL, ML and DL, the oblique area located highest, that is, the uppermost oblique area is the upper oblique area UL. When the leaning vehicle 10 is upright, the upper oblique area UL is designated as a dim area. The second uppermost oblique area that is lower than the upper oblique area UL (the uppermost oblique area) and adjacent to the upper oblique area UL in the up-down direction is the horizontal oblique area ML. When the leaning vehicle 10 is upright, the horizontal oblique area ML is designated as a brightly lit area. In the example shown by FIG. 1, when the leaning vehicle 10 is upright, the upper edge of the horizontal oblique area ML is above a horizontal reference line HL, and the lower edge of the horizontal oblique area ML is below the horizontal reference line HL. Thus, when the leaning vehicle 10 is upright, the horizontal oblique area ML designated as a brightly lit area is an oblique area including a space below the horizontal reference line HL and a space above the horizontal reference line HL. The horizontal reference line HL is, for example, a rightward and leftward extended line of the boundary line at the upper edge of the area DC extending in the left-right direction of the leaning vehicle 10 when the leaning vehicle 10 is upright.

When the leaning vehicle 10 is upright, on the right of the leaning vehicle 10, the control device 54 designates one or some of the plurality of oblique areas UR, MR and DR as (a) brightly lit area(s) and designates the other oblique area(s) as (a) dim area(s). In the example of FIG. 1, when the leaning vehicle 10 is upright, the brightly lit area on the right of the leaning vehicle 10 is the horizontal oblique area MR. In other words, when the leaning vehicle 10 is upright, the brightly lit area on the right of the leaning vehicle 10 is set such that the upper oblique area UR and the lower oblique area DR remain as dim areas. In the example shown by FIG. 1, among the plurality of oblique areas UR, MR and DR, the oblique area located highest, that is, the uppermost oblique area is the upper oblique area UR. When the leaning vehicle 10 is upright, the upper oblique area UR is designated as a dim area. The second uppermost oblique area that is lower than the upper oblique area UR (the uppermost oblique area) and adjacent to the upper oblique area UR in the up-down direction is the horizontal oblique area MR. When the leaning vehicle 10 is upright, the horizontal oblique area MR is designated as a brightly lit area. In the example shown by FIG. 1, when the leaning vehicle 10 is upright, the upper edge of the horizontal oblique area MR is above the horizontal reference line HL, and the lower edge of the horizontal oblique area MR is below the horizontal reference line HL. Thus, when the leaning vehicle 10 is upright, the horizontal oblique area MR designated as a brightly lit area is an oblique area including a space below the horizontal reference line HL and a space above the horizontal reference line HL.

Adaptive lighting control is applied to the brightly lit areas. The adaptive lighting control is controlling the bright lighting and dim lighting for the plurality of left oblique areas UL, ML and DL and the plurality of right oblique areas UR, MR and DR individually such that when there is an oncoming vehicle or a vehicle ahead in a brightly lit area, the oblique area where the oncoming vehicle or the vehicle ahead is present, out of the plurality of left oblique areas UL, ML and DL and the plurality of right oblique areas UR, MR and DR, is changed from a brightly lit area to a dim area.

When the leaning vehicle 10 turns left or right, depending on the lean angle of the vehicle body 20 in the direction of the turn, the control device 54 controls the bright lighting and dim lighting for the plurality of oblique areas UL, ML, DL in the left oblique area set and the plurality of oblique areas UR, MR and DR in the right oblique area set as follows: in the oblique area set corresponding to the direction of the turn, the control device 54 designates the second uppermost oblique area that is located lower than the uppermost oblique area and adjacent to the uppermost oblique area in the up-down direction as a brightly lit area to which the adaptive lighting control is applied and changes the uppermost oblique area from a dim area to a brightly lit area to which the adaptive lighting control is applied. Thus, when the leaning vehicle 10 turns left or right, the control device 54 controls the bright lighting and dim lighting for the pluralities of oblique areas UL, ML, DL, UR, MR and DR without the rider's operation of the leaning vehicle 10.

The lean angle of the vehicle body 20 is based on the upright position of the vehicle body 20. The lean angle of the vehicle body 20 is an inclined angle of the vehicle body 20 from the upright position. The lean angle of the vehicle body 20 is detected by a lean angle sensor configured to detect the lean angle of the vehicle body 20. A signal indicating the lean angle of the vehicle body 20 detected by the lean angle sensor is received in the control device 54.

In the example shown by FIG. 1, when the leaning vehicle 10 turns left, the upper oblique area UL changes from a dim area to a brightly lit area. Thereby, the horizontal oblique area ML and the upper oblique area UL become brightly lit areas. In other words, with the turn of the leaning vehicle 10, the brightly lit area on the left as a whole enlarges in the up-down direction. Meanwhile, the brightly lit area on the right does not change with the turn of the leaning vehicle 10.

The change of the upper oblique area UL from a dim area to a brightly lit area may be performed with light modulation. The light modulation is performed, for example, by changing the brightness gradually as time passes or as the lean angle changes.

The control device 54 designates the two center areas UC and DC as brightly lit areas not only when the leaning vehicle 10 is upright but also when the leaning vehicle 10 turns left or right.

With the headlight device 50, when the leaning vehicle 10 is upright, in each of the oblique area sets, whereas one or some of the plurality of oblique areas is/are designated as a brightly lit area to which the adaptive lighting control is applied with, the other oblique area(s) is/are designated as a dim area. This makes it possible to reduce or suppress the energy consumption associated with bright lighting for a plurality of areas in the ahead-driving direction of the vehicle. Specifically, it is possible to reduce or suppress the electric power consumption associated with bright lighting for a plurality of areas in the ahead-driving direction of the vehicle and the amount of heat generated by the bright lighting. When the leaning vehicle 10 turns left or right, as the lean angle in the direction of the turn increases, in the oblique area set corresponding to the direction of the turn, the second uppermost oblique area, which is located lower than the uppermost oblique area and adjacent to the uppermost oblique area in the up-down direction is designated as a brightly lit area to which the adaptive lighting control is applied, and the uppermost oblique area is changed from a dim area to a brightly lit area to which the adaptive lighting control is applied. Then, it becomes possible to illuminate the area the rider sees while the leaning vehicle 10 is turning. This allows the rider of the leaning vehicle 10 to see ahead well, especially during a turn. Thus, the headlight device 50 can reduce or suppress the energy consumption associated with bright lighting for a plurality of areas in the ahead-driving direction of the vehicle while enabling the rider of the leaning vehicle 10 to see ahead well, especially during a turn.

(Modification 1 of Headlight Device)

Figure 2:
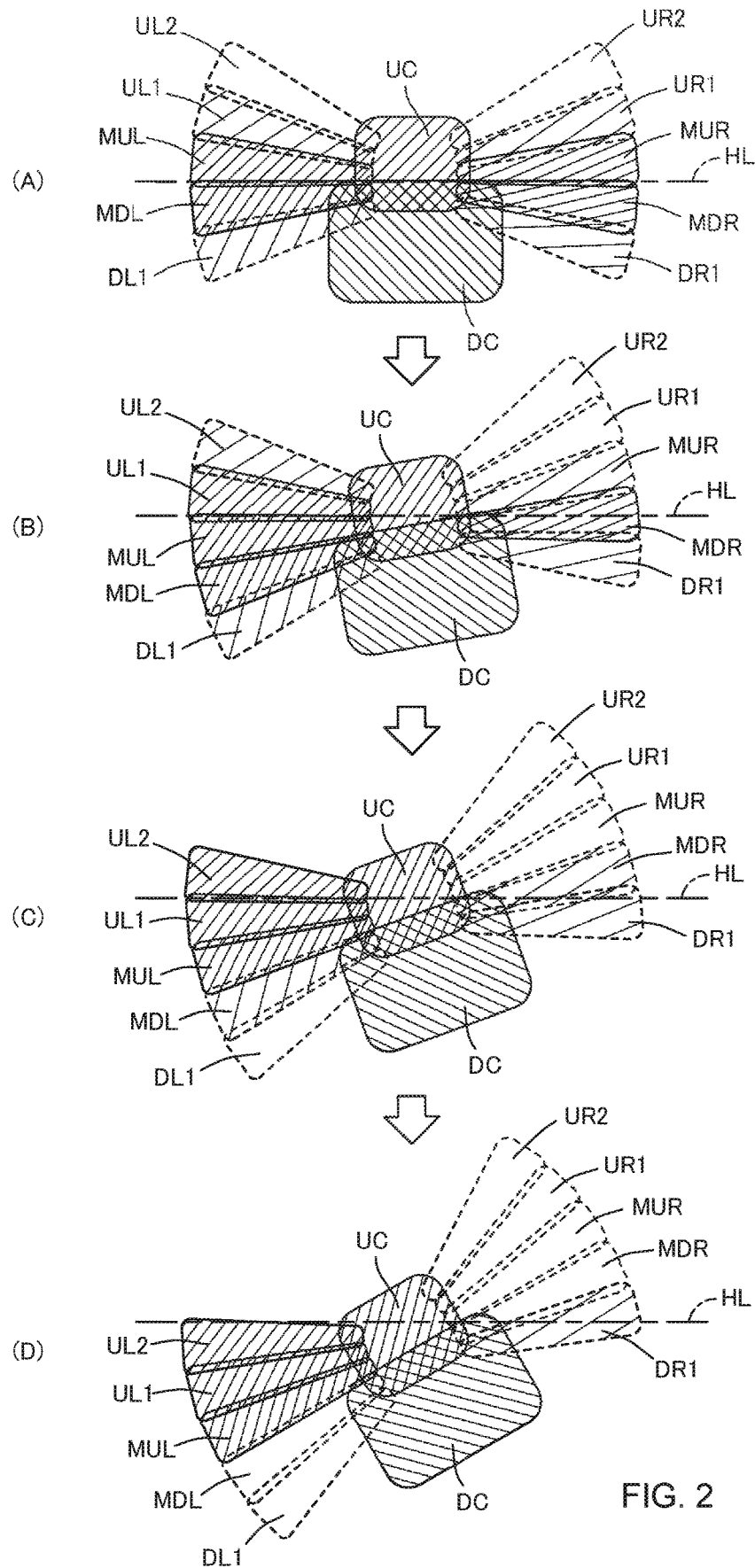
FIG. 2 shows an example of a change of brightly lit areas while a leaning vehicle with a headlight device according to Modification 1 of the embodiment is turning left from an upright state.

With reference to FIG. 2, Modification 1 of the headlight device will be described. The headlight device according to Modification 1 differs from the headlight device 50 in the plurality of areas in the ahead-driving direction of the leaning vehicle and the bright lighting and dim lighting for the plurality of areas.

In the example shown by FIG. 2, there are five oblique areas UL1, UL2, MUL, MDL and DL1 as the plurality of oblique areas located in the ahead-driving direction of the leaning vehicle on the left. The plurality of oblique areas UL1, UL2, MUL, MDL and DL1 located in the ahead-driving direction of the leaning vehicle on the left are at different heights in the up-down direction when the leaning vehicle is upright. The plurality of oblique areas UL1, UL2, MUL, MDL and DL1 includes a single immediately-higher-than-horizontal oblique area MUL that has a lower edge located nearest to a horizontal reference line HL when the leaning vehicle is upright. The plurality of oblique areas UL1, UL2, MUL, MDL and DL1 includes a single immediately-lower-than-horizontal oblique area MDL that has an upper edge located nearest to the horizontal reference line HL when the leaning vehicle is upright. The plurality of oblique areas UL1, UL2, MUL, MDL and DL1 includes an uppermost oblique area UL2. The plurality of oblique areas UL1, UL2, MUL, MDL and DL1 includes an intermediate oblique area UL1. The intermediate oblique area UL1 is located between the uppermost oblique area UL2 and the immediately-higher-than-horizontal oblique area MUL in the up-down direction. The intermediate oblique area UL1 is a second uppermost oblique area located adjacent to the uppermost oblique area UL2 in the up-down direction. The plurality of oblique areas UL1, UL2, MUL, MDL and DL1 includes a lower oblique area DL1 located lower in the up-down direction than the immediately-lower-than-horizontal oblique area MDL. The lower oblique area DL1 is a lowermost oblique area.

In the example shown by FIG. 2, there are five oblique areas UR1, UR2, MUR, MDR and DR1 as the plurality of oblique areas located in the ahead-driving direction of the leaning vehicle on the right. The plurality of oblique areas UR1, UR2, MUR, MDR and DR1 located in the ahead-driving direction of the leaning vehicle on the right are at different heights in the up-down direction when the leaning vehicle is upright. The plurality of oblique areas UR1, UR2, MUR, MDR and DR1 includes a single immediately-higher-than-horizontal oblique area MUR that has a lower edge located nearest to the horizontal reference line HL when the leaning vehicle is upright. The plurality of oblique areas UR1, UR2, MUR, MDR and DR1 includes a single immediately-lower-than-horizontal oblique area MDR that has an upper edge located nearest to the horizontal reference line HL when the leaning vehicle is upright. The plurality of oblique areas UR1, UR2, MUR, MDR and DR1 includes an uppermost oblique area UR2. The plurality of oblique areas UR1, UR2, MUR, MDR and DR1 includes an intermediate oblique area UR1. The intermediate oblique area UR1 is located between the uppermost oblique area UR2 and the immediately-higher-than-horizontal oblique area MUR in the up-down direction. The intermediate oblique area UR1 is a second uppermost oblique area adjacent to the uppermost oblique area UR2 in the up-down direction. The plurality of oblique areas UR1, UR2, MUR, MDR and DR1 includes a lower oblique area DR1 located lower in the up-down direction than the immediately-lower-than-horizontal oblique area MDR. The lower oblique area DR1 is a lowermost oblique area.

In the example of FIG. 2, when the leaning vehicle is upright, the brightly lit area on the left of the leaning vehicle is composed of the immediately-higher-than-horizontal oblique area MUL and the immediately-lower-than-horizontal oblique area MDL. When the leaning vehicle is upright, the brightly lit area on the left of the leaning vehicle is set such that the uppermost oblique area UL2, the intermediate oblique area UL1 and the lower oblique area DL1 remain as dim areas. In FIG. 2, dim areas that are set to be unlit are not hatched with their outlines shown by dashed lines. Dim areas that are set to be lit by a reduced amount of light are hatched with their outlines shown by dashed lines. Specifically, the uppermost oblique area UL2 is a dim area set to be unlit, and the intermediate oblique area UL1 and the lower oblique area DL1 are dim areas set to be lit by a reduced amount of light.

In the example of FIG. 2, when the leaning vehicle is upright, the brightly lit area on the right of the leaning vehicle is composed of the immediately-higher-than-horizontal oblique area MUR and the immediately-lower-than-horizontal oblique area MDR. When the leaning vehicle is upright, the brightly lit area on the right of the leaning vehicle is set such that the uppermost oblique area UR2, the intermediate oblique area UR1 and the lower oblique area DR1 remain as dim areas. The uppermost oblique area UR2 is a dim area set to be unlit, and the intermediate oblique area UR1 and the lower oblique area DR1 are dim areas set to be lit by a reduced amount of light.

In the example of FIG. 2, while the leaning vehicle is turning left, the brightly lit area on the left enlarges from two oblique areas to three oblique areas, and thereafter shifts upward direction of the vehicle. Meanwhile, the brightly lit area on the right shrinks from two oblique areas to one oblique area, and thereafter disappears.

(Other Modifications of Headlight Device)

Figure 3:
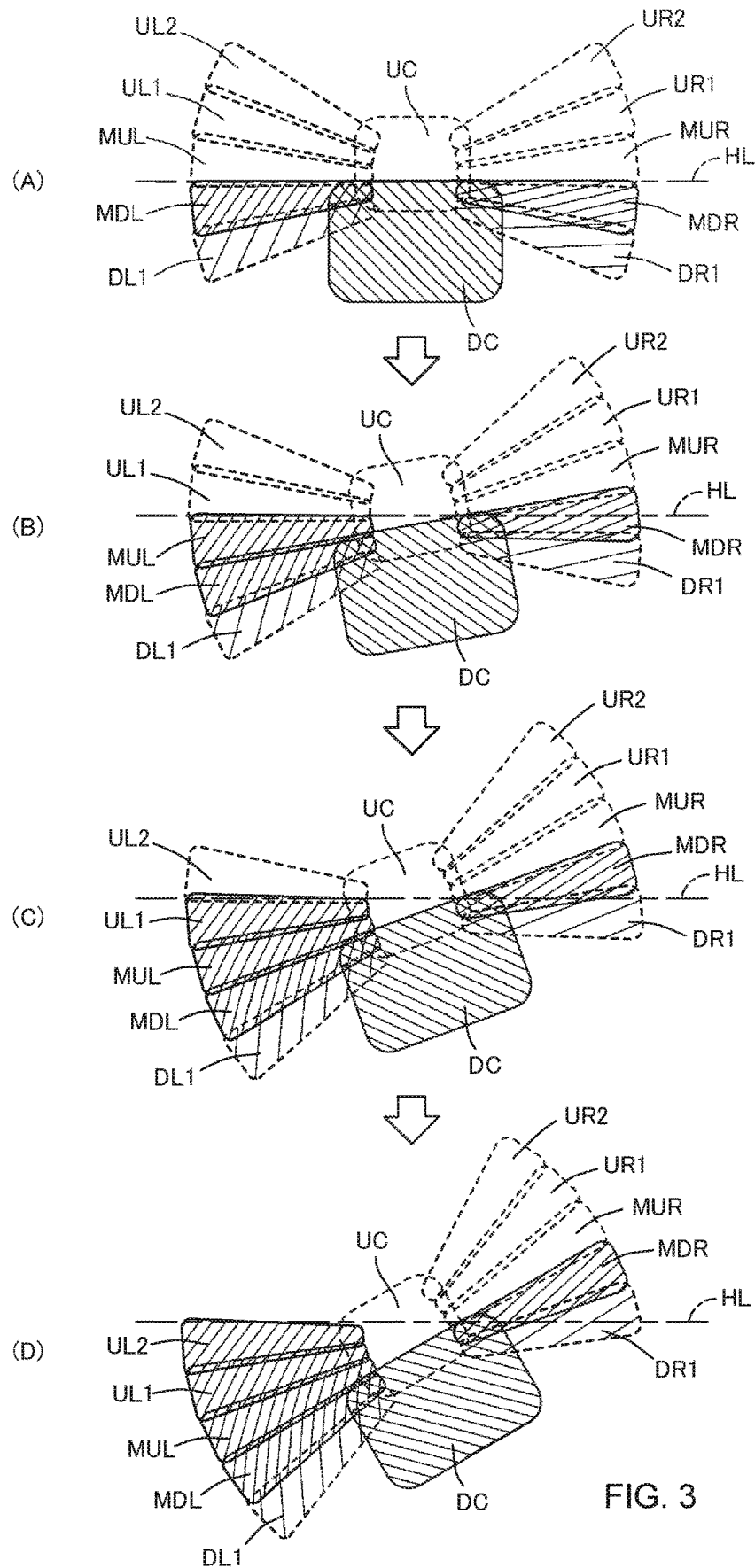
FIG. 3 shows an example of a change of brightly lit areas while a leaning vehicle with a headlight device according to Modification 2 of the embodiment is turning left from an upright state.
Figure 4:
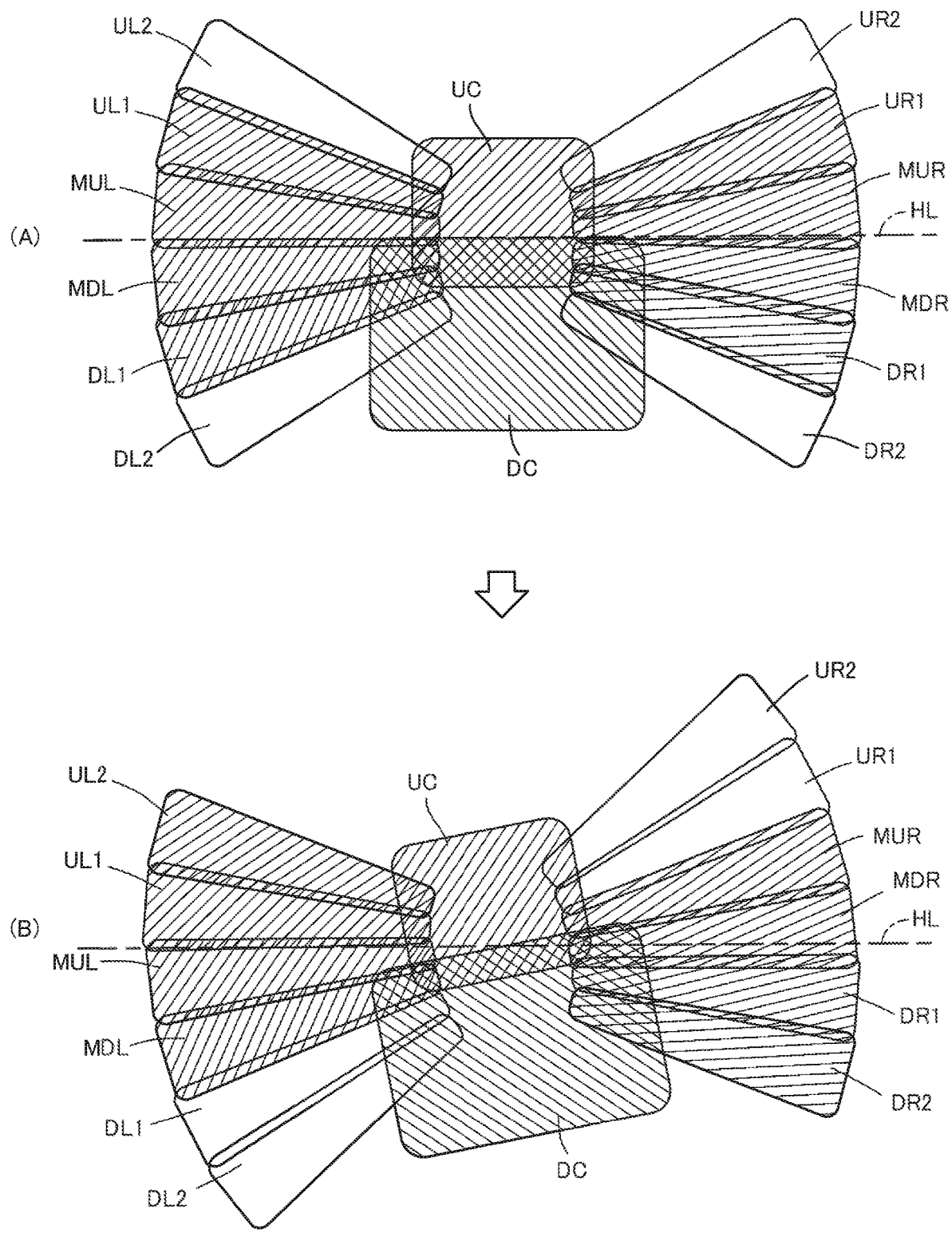
FIG. 4 shows an example of a change of brightly lit areas while a leaning vehicle with a headlight device according to Modification 3 of the embodiment is turning left from an upright state.
Figure 5:
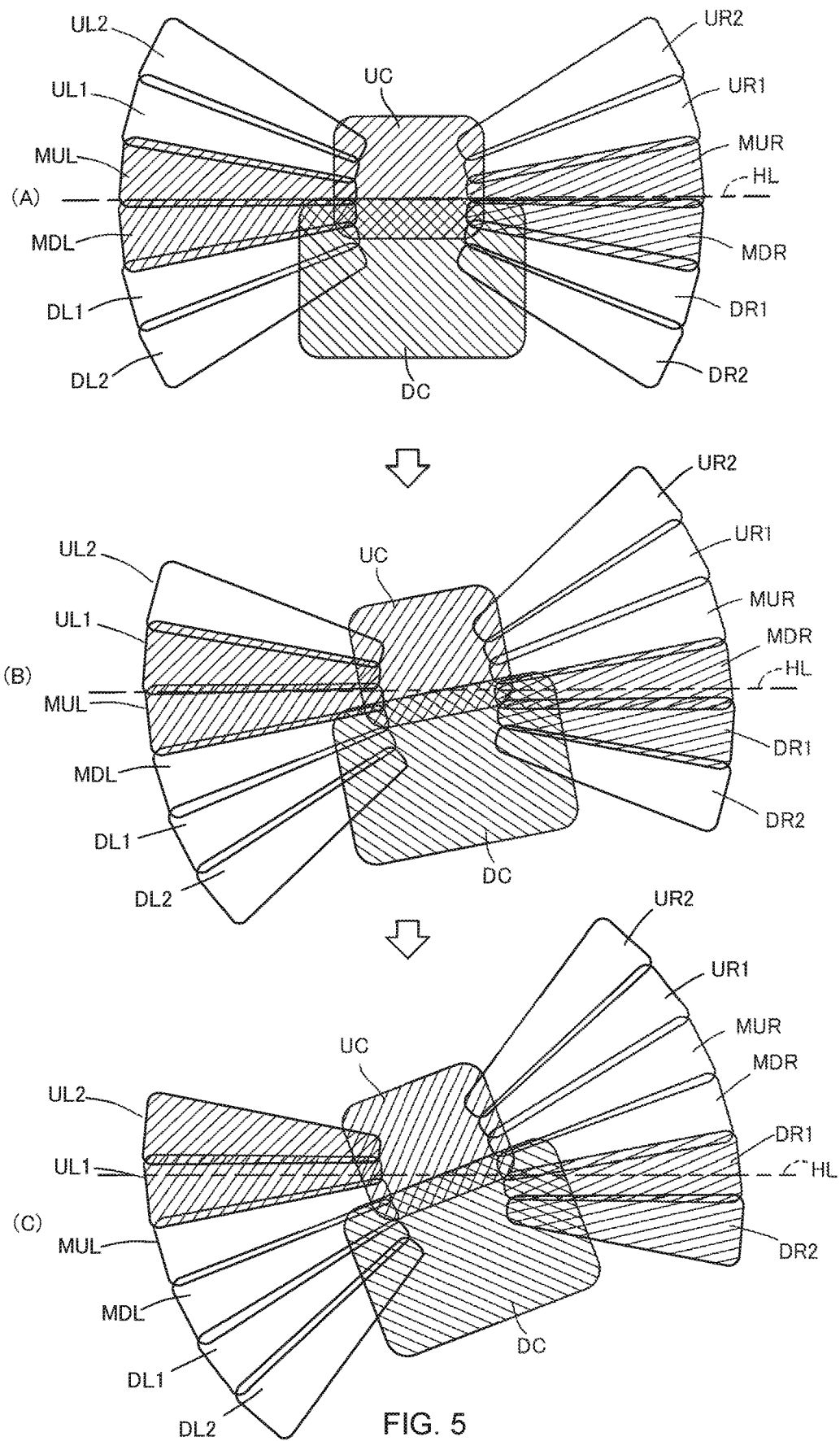
FIG. 5 shows an example of a change of brightly lit areas while a leaning vehicle with a headlight device according to Modification 4 of the embodiment is turning left from an upright state.

The setting of brightly lit areas and dim areas when the leaning vehicle is upright is not limited to the example shown by FIG. 2. For example, the setting of brightly lit areas and dim areas when the leaning vehicle is upright may be set as shown by FIG. 3, 4 or 5. In the examples shown by FIGS. 4 and 5, there are six oblique areas UL2, UL1, MUL, MDL, DL1 and DL2 as the plurality of oblique areas in the ahead-driving direction of the leaning vehicle on the left. The lower oblique area DL2 is a lowermost oblique area.

There are six oblique areas UR2, UR1, MUR, MDR, DR1 and DR2 as the plurality of oblique areas in the ahead-driving direction of the leaning vehicle on the right. The lower oblique area DR2 is a lowermost oblique area. In FIGS. 4 and 5, brightly lit areas are hatched, and dim areas are not hatched.

Other Embodiments

The embodiments and modifications described above and/or illustrated by the drawings are to make the present disclosure easier to understand and not to limit the concept of the present disclosure. It is possible to adapt or alter the embodiments and modifications described above without departing from the gist thereof. The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments and modifications described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

For example, in the examples shown by FIGS. 1 to 5, the area UC is a brightly lit area; however, the area UC may be a dim area.

LIST OF REFERENCE SIGNS

10: leaning vehicle
20: vehicle body
50: headlight device
52: headlight
54: control device

The invention claimed is:

1. A headlight device to be employed in a leaning vehicle that, when turning left or right, leans in a direction of the turn, the headlight device comprising:
   a headlight including a plurality of light sources for respectively lighting a plurality of areas in an ahead-driving direction of the leaning vehicle, the plurality of areas including a pair of oblique area sets, which are a left oblique area set and a right oblique area set that are located in the ahead-driving direction of the leaning vehicle on the left and on the right, respectively, each of the oblique area sets including a plurality of oblique areas that are positioned at different heights in an up-down direction and that includes an uppermost oblique area, which is a highest one of the plurality of oblique areas therein, when the leaning vehicle is upright; and
   a control device that controls the headlight to perform bright lighting and dim lighting for the plurality of oblique areas in each of the oblique area sets, such that when the leaning vehicle is upright, the control device controls the lighting in each of the oblique area sets, by designating at least one of the plurality of oblique areas of said each oblique area set as in a brightly lit area, and designating the rest of the plurality of oblique areas of said each oblique area set, including the uppermost oblique area thereof, as in a dim area,
   when the leaning vehicle turns left or right, a brightly lit area as a whole in one of the oblique area sets corresponding to the direction of the turn is larger in the up-down direction than that in the other of the oblique area sets, and as a lean angle in the direction of the turn increases, the control device controls the lighting in the one of the oblique area sets corresponding to the direction of the turn, by designating a second uppermost oblique area, which is one of the plurality of oblique areas located immediately below the uppermost oblique area in the up-down direction, as in the brightly lit area, and by redesignating the uppermost oblique area, in the dim area, as in the brightly lit area, and
   the control device applies adaptive lighting control to the brightly lit area, by redesignating one or more oblique areas in the brightly lit area to be in the dim area, upon detecting an oncoming vehicle and/or a vehicle ahead in said one or more oblique areas.

2. The headlight device according to claim 1, wherein:
   each of the oblique area sets includes a single immediately-higher-than-horizontal oblique area;
   the single immediately-higher-than-horizontal oblique area is one of the plurality of oblique areas that is located lower than the uppermost oblique area of said each oblique area set, and has a lower edge located nearest to a horizontal reference line among lower edges of all of the plurality of oblique areas of said each oblique area set when the leaning vehicle is upright; and
   when the leaning vehicle is upright, the single immediately-higher-than-horizontal oblique area is designated as in the brightly lit area.

3. The headlight device according to claim 2, wherein:
   each of the oblique area sets includes an intermediate oblique area, which is located between the uppermost oblique area and the single immediately-higher-than-horizontal oblique area of said each oblique area set in the up-down direction, and is composed of at least one of the plurality of oblique areas of said each oblique area set; and
   when the leaning vehicle is upright,
   the single immediately-higher-than-horizontal oblique area is designated as in the brightly lit area, and the uppermost oblique area is designated as in the dim area; and
   in the intermediate oblique area, at least one of said at least one oblique area, which is continued from the uppermost oblique area thereof, is designated as in the dim area, and the rest of said at least one oblique area is designated as in the brightly lit area.

4. The headlight device according to claim 3, wherein the control device controls at least one of the plurality of light sources, corresponding to one or more oblique areas of the intermediate oblique area designated as in the dim area, such that said one or more oblique area of the intermediate oblique area designated as in the dim area is lit less brightly than the single immediately-higher-than-horizontal oblique area but more brightly than the uppermost oblique area.

5. The headlight device according to claim 1, wherein:
   each of the oblique area sets includes a single immediately-lower-than-horizontal oblique area;
   the single immediately-lower-than-horizontal oblique area is one of the plurality of oblique areas of said each oblique area set that has an upper edge located nearest to a horizontal reference line among upper edges of all of the plurality of oblique areas of said each oblique area set when the leaning vehicle is upright; and when the leaning vehicle is upright, the immediately-lower-than-horizontal oblique area is designated as in the brightly lit area.

6. The headlight device according to claim 5, wherein:
each of the oblique area sets includes a lower oblique area in addition to the single immediately-lower-than-horizontal oblique area, the lower oblique area being located lower than the single immediately-lower-than-horizontal oblique area in the up-down direction and being composed of at least one of the plurality of oblique areas in said each oblique area set; and when the leaning vehicle is upright,
the single immediately-lower-than-horizontal oblique area is designated as in the brightly lit area; and
the lower oblique area includes a lowermost oblique area that is a lowest one of said at least one oblique area in the lower oblique area, at least the lowermost oblique area being designated as in the dim area.

7. The headlight device according to claim 5, wherein the control device controls at least one of the plurality of light sources, corresponding to one or more oblique areas of the lower oblique area designated as in the dim area, such that said one or more oblique areas of the lower oblique area designated as in the dim area is lit less brightly than the single immediately-lower-than-horizontal oblique area.

8. The headlight device according to claim 1, wherein:
when the leaning vehicle turns left or right, as the lean angle in the direction of the turn increases, the control device controls the headlight such that the brightly lit area shifts in an upward direction of the vehicle, during which an uppermost area of the brightly lit area shifts from the second uppermost oblique area to the uppermost oblique area.

9. The headlight device according to claim 1, wherein when the leaning vehicle turns left or right, as the lean angle in the direction of the turn increases, the control device controls the headlight such that:
in one of the oblique area sets corresponding to the direction of the turn, a total number of oblique areas in the brightly lit area increases, whereby the brightly lit area as a whole in the one oblique area set enlarges in the up-down direction, during which the uppermost oblique area thereof becomes a part of the brightly lit area after the second uppermost oblique area, and
in the other of the oblique area sets, the total number of oblique areas in the brightly lit area decreases, whereby the brightly lit area as a whole in said other oblique area set shrinks in the up-down direction.

10. The headlight device according to claim 1, wherein:
the bright lighting includes lighting one or more of the plurality of areas in the ahead-driving direction of the leaning vehicle more brightly than the dim lighting;
the dim lighting includes lighting one or more of the plurality of areas in the ahead-driving direction of the leaning vehicle less brightly than the bright lighting, or not lighting said one or more of the plurality of areas;
the brightly lit area is an area lit more brightly by the headlight device than the dim area; and
the dim area is an area that is either lit less brightly by the headlight device than the brightly lit area or unlit by the headlight device.

11. The headlight device according to claim 1, wherein:
when one of the plurality of light sources emits light with a brightness that is more than half of a maximum brightness of said one light source, the corresponding oblique area lit by said one light source is in the brightly lit area, at which time the brightness of the brightly lit area is defined as a maximum brightness of the brightly lit area;
the bright lighting includes lighting one of the plurality of oblique areas in such a manner as to cause said one oblique area to have a brightness that is more than half of the maximum brightness of the brightly lit area;
the dim lighting includes lighting one of the plurality of oblique areas less brightly than the bright lighting, or not lighting said one oblique area;
the brightly lit area is lit by the headlight device in such a manner as to have a higher brightness than the dim area; and
the dim area is lit by the headlight device in such a manner as to either have a lower brightness than the brightly lit area, or be unlit by the headlight device.

12. The headlight device according to claim 1, wherein:
when one of the plurality of light sources emits light with a brightness that is more than 60% of a maximum brightness of said one light source, the corresponding oblique area lit by the light is in the brightly lit area, at which time the brightness of the brightly lit area is defined as a maximum brightness of the brightly lit area;
the bright lighting includes lighting one of the plurality of oblique areas in such a manner as to cause said one oblique area to have a brightness that is more than 60% of the maximum brightness of the brightly lit area;
the dim lighting includes lighting one of the plurality of oblique areas less brightly than the bright lighting, or not lighting said one oblique area;
the brightly lit area is lit by the headlight device in such a manner as to have a higher brightness than the dim area; and
the dim area is lit by the headlight device in such a manner as to either have a lower brightness than the brightly lit area, or be unlit by the headlight device.

13. A leaning vehicle comprising:
a leaning vehicle body that, when the leaning vehicle turns left or right, leans in the direction of the turn; and
the headlight device according to claim 1.

* * * * *